United States Patent [19]

Hofele

[11] Patent Number: 4,985,609
[45] Date of Patent: Jan. 15, 1991

[54] METHOD OF MAKING A BROACH

[76] Inventor: Franz Hofele, Wagnerstrasse 86, 7322 Donzdorf, Fed. Rep. of Germany

[21] Appl. No.: 201,526

[22] Filed: Jun. 2, 1988

[30] Foreign Application Priority Data

Jun. 16, 1987 [DE] Fed. Rep. of Germany ....... 3720203

[51] Int. Cl.[5] .............................................. B23P 1/08
[52] U.S. Cl. .............................. 219/69.17; 219/69.12; 219/69.15; 219/77
[58] Field of Search ...................... 219/68, 69 R, 69 E, 219/69 M, 69 W, 77

[56] References Cited

U.S. PATENT DOCUMENTS

| 3,399,443 | 9/1968 | Roy et al. | 219/69 M |
|---|---|---|---|
| 3,528,154 | 9/1970 | Schmidt | 29/95.1 |
| 3,952,179 | 4/1976 | Baker | 219/69 E |
| 4,038,730 | 8/1977 | Tersch | 29/95.1 |
| 4,046,984 | 9/1977 | Vial | 219/69 E |
| 4,387,287 | 6/1983 | Marazzi | 219/69 M |
| 4,485,288 | 11/1984 | Schneider | 219/69 W |
| 4,490,600 | 12/1984 | Rae | 219/69.12 |

FOREIGN PATENT DOCUMENTS

| 2833765 | 10/1979 | Fed. Rep. of Germany . | |
| 3619765 | 1/1987 | Fed. Rep. of Germany . | |
| 0709305 | 1/1980 | U.S.S.R. | 219/69 W |
| 0774891 | 10/1980 | U.S.S.R. | 219/69 W |

Primary Examiner—M. H. Paschall
Attorney, Agent, or Firm—Henry M. Feiereisen

[57] ABSTRACT

A broach which has several cutting elements and a support unit to which the cutting elements are attached is made by cutting the cutting elements through electric-discharge machining, in particular wire-EDM so that the production thereof is less time consuming and less expensive. Moreover, the cutting elements can already be made to final size and final hardness.

11 Claims, 3 Drawing Sheets

METHOD OF MAKING A BROACH

The invention refers to a method of making a broach with several cutting elements and a support unit to which the cutting elements are attached.

BACKGROUND OF THE INVENTION

Such a broach consisting of several parts is known e.g. from the DE-OS No. 23 00 031. This broach is used for internal broaching and has annular cutting elements which are supported by annular holders centered by a mandrel and bearing against each other with their end faces. The holders are tightened against each other by a nut on one end of the mandrel against a collar on the other end of the mandrel, with each cutting element being urged by an annular nut against the holders. The mentioned DE-OS No. 23 00 031 is silent as to the making of the cutting elements and the holders so that it can be assumed that they are made by conventional means through one or several turning operations or milling operations, heat treatments and grinding steps in correspondence to e.g. DE-OS No. 34 15 332 which describes the making of one-piece broaches. The plurality of machining steps and the great number of individual parts requiring such machining render the making of the above-mentioned multipart broach very cumbersome and expensive.

From the EP-PS No. 0 013 189, a multipart broach is known in which the annular cutting elements are directly centered on the mandrel and are retained against rotation by wedges arranged in flutes of the cutting elements and cooperating with a flattening of the mandrel. The ends of the flutes are filled with cast resin. A spacer ring is respectively arranged between adjacent cutting elements and is also centered by the mandrel.

SUMMARY OF THE INVENTION

This EP-PS No. 0 013 189 is also silent as to the making of the individual parts of the broach so that it can be assumed that they are made by conventional means in correspondence to the making of one-part broaches through one or more turning operations or milling operations, heat treatments and grinding methods. The filling of the ends of the flutes in the cutting elements represents a further working step. As is the case in connection with the making of the broach known from the DE-OS No. 23 00 031, the making of the broach as known from the EP-PS No. 0 013 189 is lengthy and accordingly expensive.

It is an object of the invention to provide a method of making a broach of this type which can be carried out in few steps in a faster and less expensive manner and still ensures high precision, long service life and allows a simple resharpening of the obtained broach.

The object is attained in accordance with the invention by making the cutting elements through electric-discharge machining (EDM).

The method according to the invention has the advantage that the cutting elements can be made in one working step nearly or completely to final size with the required final hardness because the cutting by means of electric-discharge machining results in a high dimensional accuracy and a high surface finish of the cutting elements and allows the use of hard or hardened material which already have the degree of hardness required for the cutting elements. Moreover, the method according to the invention allows the making of cutting elements of all types of broaches for internal broaching, external broaching and flat broaching in all sizes and in a versatility of shapes which can not be obtained with conventional methods.

The cutting elements can be made in an especially economical manner by cutting at least some of the cutting elements through electric-discharge machining in one working step from a stack of metal pieces. The making of the cutting elements in such "stacks" results in cutting elements which have the same high dimensional accuracy in each stack.

In a broach as known e.g. from the EP-PS No. 0 013 189 in which the cutting elements are of annular shape and are provided at one circumferential side with teeth projecting in radial direction and spaced in circumferential direction and in which the support unit includes an essentially cylindrical body with the cutting elements coaxially placed thereon at an axial distance from each other and centered by bearing against a circumferential surface of the cylindrical body with one circumferential surface which opposes the teeth, the method according to the invention can be carried out in advantageous manner by cutting the cutting elements from a metal plate through wire-EDM, with the end faces confining the teeth in radial direction being tapered and the sections between the teeth being of cylindrical shape. A further machining of the thus made cutting elements e.g. grinding as required for the cutting elements of the known broaches in order to provide the cutting elements in the final shape and final size is not necessary with the method according to the invention. The angle of inclination of the tapered end faces of the teeth which angle is designated as relief angle in broaches is randomly selectable. However, the rake angle of the teeth is 0°. In order to obtain a different rake angle, the cutting elements must be machined e.g. by grinding after the electric-discharge machining.

As already mentioned, the method according to the invention allows the making of broaches for internal broaching and also for external broaching. In a broach for internal broaching as known from the EP-PS No. 0 013 189 in which the teeth are arranged at the outer circumferential side of the cutting elements and at least one section of the circumferential area defining the central bore of the cutting elements is cylindrically shaped, according to a further development of the invention, the central bore of the cutting elements may be provided by drilling a hole of a diameter smaller than the central bore, and then cutting the remainder through wire-EDM.

According to a further development of the invention, the cutting elements are simply secured against rotation by providing the central bore of the cutting elements over a part of their circumference in cylindrical manner and over the remaining part in flat manner, and by providing the outer circumferential surface of the cylindrical body with a flattened area having a width corresponding to the flat circumferential area of the central bore, and by arranging the cutting elements in form-locking manner on the cylindrical body. Additional safety elements preventing a rotation as e.g. wedges as disclosed in the broaches according to the EP-PS No. 0 013 189 are not required.

A broach for internal broaching can be made in an especially economical manner in accordance with a further development of the invention by simultaneously cutting out some of the cutting elements in one working step from a stack of metal plates by means of wire- EDM, with the tapered circumferential surface sections of the cutting elements which are cut out in one working step confining the teeth in radial direction and extending along the generated surface of a cone. This is again advantageous as the cutting elements simultaneously cut out through wire-EDM have the same high dimensional accuracy. Moreover, the relief angle of all cutting elements which are cut out simultaneously is absolutely the same and randomly selectable.

In the event the relief angle of the teeth of all cutting elements should be the same in a broach for internal broaching, and the tooth feed, i.e. increase in height of one tooth of a cutting element to the respective tooth of a successive cutting element should differ from the one as necessarily obtained during cut out of superimposed cutting elements, the method according to the invention can be modified as follows. The cutting elements are cut out in sets from the stack of metal plates through wire-EDM, with the tapered circumferential surface sections of the cutting elements which are arranged at the same position in the sets confining the teeth and having different small and large diameters but the same angle of inclination and with the cutting elements of differing sets being successively placed on the cylindrical body. By altering the sequence of the cutting elements from the various sets, the tooth feed may be varied in a broach.

It will be appreciated that the method according to the invention should not be limited to the making of cutting elements incorporating in dependence on the tooth feed roughing teeth, finishing teeth and scraping teeth with or without chip breaking flutes but may be employed to make parts of the smoothing member of a broach and also spacer rings arranged between the cutting elements and smoothing elements.

BRIEF DESCRIPTION OF THE DRAWING

The invention will now be described in more detail with reference to the accompanying drawing in which.

DETAILED DESCRIPTION OF PREFERRED EMBODIMENT

Figure 1:
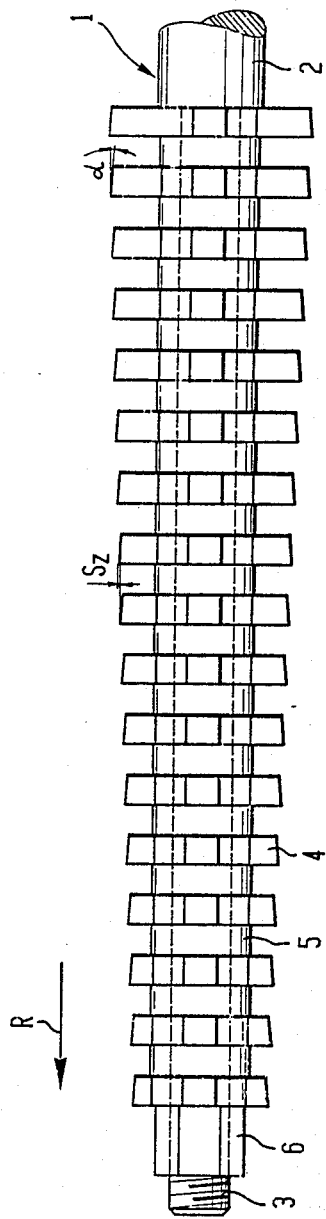
FIG. 1 shows a broach made in accordance with a method according to the invention and provided for internal broaching, with the broach illustrated only with the cutter section ease of illustration.
Figure 2:
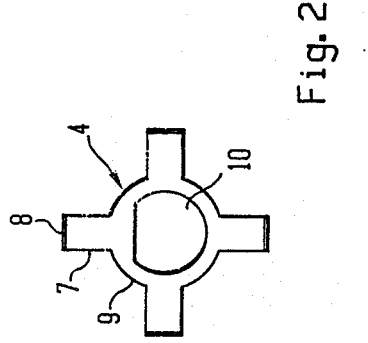
FIG. 2 is a top view of a single cutting element of the broach illustrated in FIG. 1.

In FIG. 1, a broach for cutting internal surfaces is illustrated which includes a mandrel 1 having a central section extending between a collar 2 and a threaded section 3 and supporting a plurality of annular cutting elements 4 and spacer rings 5. The cutting elements 4 and the spacer rings 5 are coaxially placed on the mandrel 1, with each spacer ring 5 arranged between two adjoining cutting elements 4. The cutting elements 4 and the spacer rings 5 are pushed against the collar 2 by a nut 6 arranged on the threaded section 3 of the mandrel 1. The cutting elements 4 are provided at their outer circumferential area with several radially projecting teeth 7 which are spaced in circumferential direction and terminate in radial direction in tapered surface sections 8. The surface sections 9 between the teeth are of cylindrical shape. The central bore 10 of the cutting elements 4 is of cylindrical shape over a part of its circumference and of flat shape over the remaining part thereof. The radial length of the teeth 7 of the cutting elements 4 varies for each cutting element 4, as can be seen from FIG. 1. Both end faces of the cutting elements 4 are flat and extend parallel to each other. The cutting elements 4 are positioned on the mandrel 1 in a known manner such that the cutting elements 4 face with their end face of larger diameter in broaching direction R and the size of the cutting elements 4 increases opposite to the broaching direction R.

The central section of the mandrel 1 is cylindrical over a portion of its circumference and has a flattened area which extends over the entire length of the central section of the mandrel 1 and corresponds in width to the flat circumferential part of the central bore 10 of the cutting elements 4.

The cutting elements 4 are arranged in form locking manner on the central section of the mandrel 1 and are centered and secured against rotation by the circumferential area which confines the central bore 10 of the cutting elements 2 and bears against the outer circumferential area of the central section of the mandrel 1. The spacer rings 5 are centered on the mandrel 1 in corresponding manner.

The cutting elements 4 are made from a metal plate by means of wire-EDM. Because of the high dimensional accuracy and the obtained surface finish, there is no necessity to subsequently machine the cutting elements 4 by grinding after being cut out from the metal plate. It is, however, possible to machine the cutting elements to greater size through wire-EDM and then to grind them to final size. Certainly, the spacer rings 5 may be made through wire-EDM as well.

When individually making the cutting elements 4 by means of wire-EDM, the relief angle $\alpha$ is randomly selectable. Also, the degree of tooth feed $S_Z$ is randomly selectable when individually making the cutting elements 4 and may even be arbitrarily varied over the length of the broach.

Figure 4A:
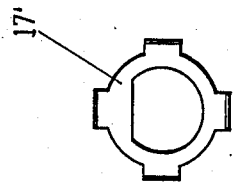
FIGS. 4a to 4c illustrate top views of various cutting elements with indication of their position in the stack of metal plates as shown in FIG. 3.
Figure 4B:
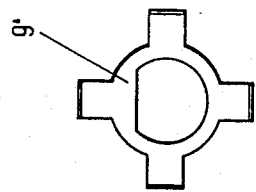
Figure 4C:
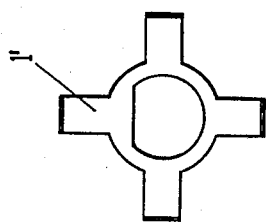
Figure 3:
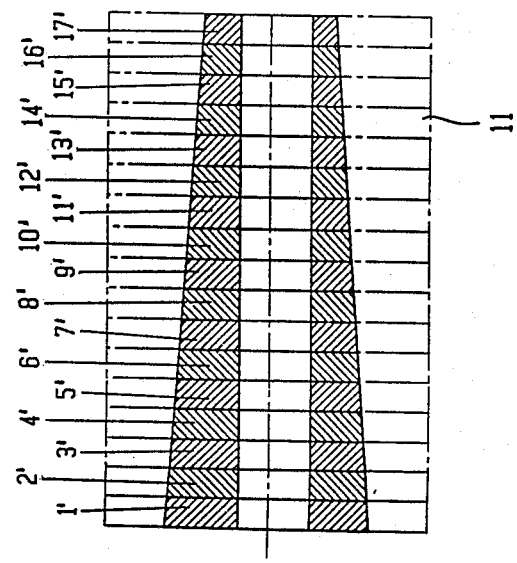
FIG. 3 is a schematic illustration of the cutting elements during making from a stack of metal plates.

The cutting elements 4 are made in especially economical manner by wire-EDM as illustrated in FIG. 3. The cutting elements 4 are simultaneously cut out in one working step by wire-EDM from a stack of metal plates 11. As can be seen from FIG. 3, the tapered end faces 8 of the teeth 7 of all cutting elements 4 as simultaneously cut out in one working step extend on the envelope of a cone, the taper of which corresponds to the relief angle $\alpha$ of the individual teeth 7 and is randomly selectable. Since the generating line of the cone is straight, the relief angle $\alpha$ of the teeth 7 of all cutting elements 4 is the same in the illustration of FIG. 3. FIGS. 4a to 4c illustrate the shape of the cutting elements 4 which correspond to the positions 1', 9', 17' in the stack of metal plates 11. The taper of the cone defines also the tooth feed which, however, may vary depending on the sequence of the individual cutting elements. When the cutting elements 4 are placed on the mandrel 1 in correspondence to their position in the stack, the tooth feed is of a defined magnitude determined by the taper of the cone. A greater tooth feed can be attained by placing only every second cutting element 4 of the stack on the mandrel of the broach.

Figure 5:
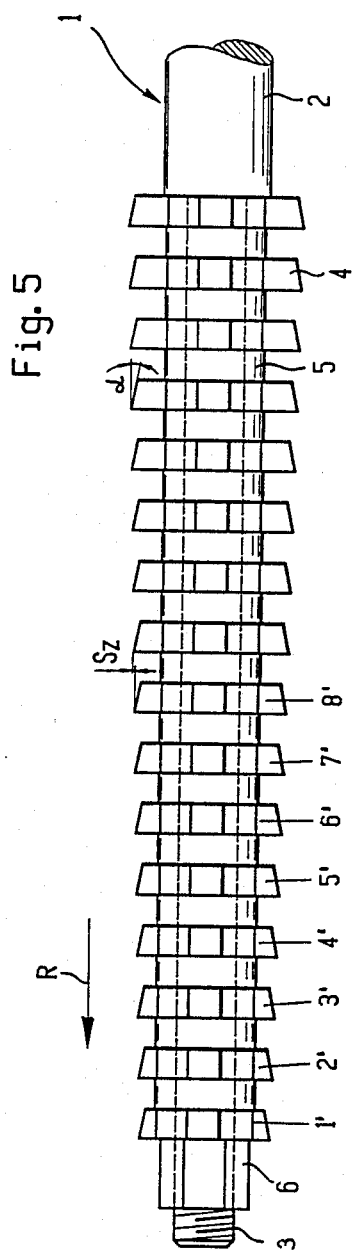
FIG. 5 shows an illustration of the broach similar to FIG. 1, with the cutting elements made in sets from a stack of metal plates and with some of the cutting elements designated by the positions they occupy in the broach.
Figure 6:
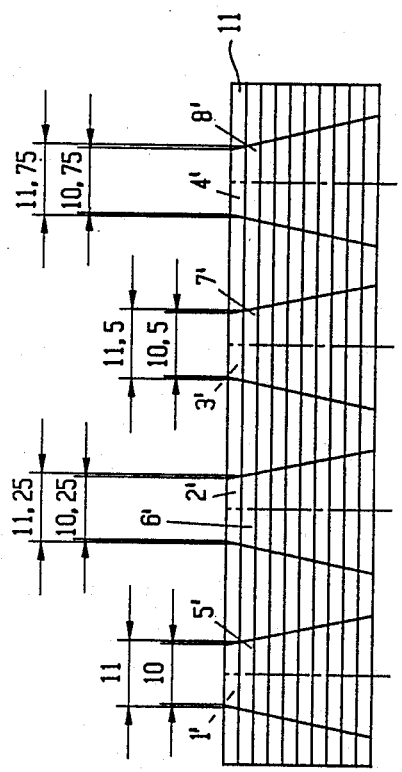
FIG. 6 is a schematic illustration of sets of cutting elements of the broach illustrated in FIG. 5 in a stack of metal platess, with the positions of the cutting elements as indicated in FIG. 5 being repeated in the various sets and with the diameter of the first four cutting elements of the broach shown in FIG. 5 indicated by way of example.

FIGS. 5 and 6 show a modification of the method according to the invention. According to this method, sets of cutting elements 4 are cut out from the metal plates 11 through wire-EDM. The taper of the cones of the various sets are the same and thus, the relief angles $\alpha$ of the teeth of the cutting elements 5 of all sets are the same. However, the smaller or larger diameters of the cutting elements arranged at corresponding positions in the sets differ. As indicated in FIG. 6, the greater diameter of the uppermost cutting elements 4 in the stack is 11 mm in the first set, 11.25 mm in the second set, 11.5 mm in the third set and 11.75 mm in the fourth set. The smaller diameter of these cutting elements is e.g. 10 mm in the first set, 10.25 mm in the second set, 10.5 mm in the third set and 10.75 mm in the fourth set. The cutting elements 4 as made in this manner are arranged on the mandrel 1 by successively placing the uppermost cutting elements of the first, second, third and, forth, set on the mandrel 1 to occupy the positions 1', 2', 3' and 4'. Subsequently, the cutting elements in the second row of the first, second, third and forth set are successively placed on the mandrel to occupy the positions 5' to 8. The further cutting elements are arranged accordingly on the mandrel. By making and arranging the cutting elements in this manner, the degree of tooth feed $S_Z$ can be smaller than would be possible when making the cutting elements in one set. It will be readily recognized that the tooth feed may be varied over the length of the mandrel by deviating from the above sequence of the cutting elements.

In all modifications of the method, the central bore 10 of the cutting elements 4 can be made by drilling in the cutting elements a hole which is of smaller diameter than the diameter of the actual central bore 10, and subsequently by cutting out the remainder through wire-EDM. When making the cutting elements 4 from the stack of metal plates, the holes may certainly simultaneously be drilled and the remainder may be cut out by means of wire-EDM in the stack.

With the method according to the invention, cutting elements may be made with a number of teeth other than four. In addition, the shape of the teeth may be different than shown. Also, the cutting elements may be secured against rotation by means other than those shown and described e.g. by means of groove and spring.

In order to resharpen the cutting elements 4, the latter are removed from the mandrel 1, placed on a surface and ground. The resharpening of the cutting elements 4 through grinding is especially simple because the respective end face is flat and thus the rake angle is 0°. In order to compensate the diametrical decrease of the cutting elements during grinding, the smallest cutting element is omitted when placing the cutting elements again on the mandrel.

In the illustrated and described exemplified embodiment, the spacer rings 5 have a cylindrical shape and are of a same diameter. It is certainly conceivable to provide the spacer rings with a shape similar to the cutting elements i.e. to provide the spacer rings with increasing diameter in correspondence with the increasing diameter of the cutting elements and with external conical circumference in order to keep essentially constant the distance of the teeth from the spacer rings over the length of the broach so that also the larger cutting elements are sufficiently supported by the spacer rings. Especially such conically shaped spacer rings can then be suitably made individually or in sets in similar manner as the cutting elements by means of wire-EDM.

While the invention has been illustrated and described as embodied in a Method of Making a Broach, it is not intended to be limited to the details shown since various modifications and structural changes may be made without departing in any way from the spirit of the present invention.

What is claimed as new and desired to be protected by Letters Patent is set forth in the appended claims:

I claim:

1. A method of making a broach, comprising the steps of:
   cutting an plurality of suitably graded cutting elements by means of electric discharge between an electrically conductive wire and metal; and
   successively arranging the cutting elements on a support unit wherein the cutting elements are of annular shape and are provided at one circumferential side thereof with radially projecting teeth spaced in circumferential direction and wherein the support unit includes an essentially cylindrical body which coaxially supports the cutting elements at axial distance from each other, with the cutting elements being centered by bearing against a circumferential surface of the cylindrical body with one circumferential surface which opposes the teeth, characterized in that the cutting elements are cut out from a metal plate through wire-EDM, with the surface sections which bound the teeth in radial direction being of tapered shape and the surface sections between the teeth being of cylindrical shape.

2. A method according to claim 1, characterized in that at least some of the cutting elements are cut out simultaneously in one working step from a stack of metal plates by means of wire electric-discharge machining.

3. A method according to claim 1 wherein the cutting elements are of annular shape and are provided at one circumferential side thereof with radially projecting teeth spaced in circumferential direction and wherein the support unit includes an essentially cylindrical body which coaxially supports the cutting elements at axial distance from each other, with the cutting elements being centered by bearing against a circumferential surface of the cylindrical body with one circumferential surface which opposes the teeth, characterized in that the cutting elements are cut out from a metal plate through wire-EDM with the surface sections which bound the teeth in radial direction being of tapered shape and the surface sections between the teeth being of cylindrical shape.

4. A method according to claim 1 wherein the teeth are arranged at the outer circumferential side of the cutting elements and at least one section of the circumferential area which defines the central bore of the cutting elements is shaped cylindrically, characterized in that the central bore of the cutting elements is obtained by initially drilling a hole of a diameter smaller than the central bore and then by cutting out the remainder through wire-EDM.

5. A method according to claim 4, characterized in that the central bore of the cutting elements is of cylindrical shape over a portion of its circumference and is flat over the remaining portion, and that the outer circumferential area of the cylindrical body is provided with a flattened area corresponding in width to the flat circumferential part of the central bore, and that the cutting elements are arranged in form-locking manner on the cylindrical body so as to be secured against rotation.

6. A method according to one of the claims 1 to 5, characterized in that at least some of the cutting elements are cut out simultaneously in one working step from a stack of metal plates by wire-EDM, with all tapered circumferential surface sections of the cutting elements which simultaneously cut out in one working step defining the teeth in radial direction and extending on the generated surface of a cone.

7. A method according to claim 6, characterized in that the cutting elements are cut out in sets from the stack of metal plates by means of wire-EDM, with the tapered circumferential surface sections of the cutting elements which are arranged in sets at the same position defining the teeth and having different small and large diameters but the same angle of inclination and with the cutting elements of different sets being successively placed on the cylindrical body.

8. A method according to claim 3, characterized in that at least some of the cutting elements are cut out simultaneously in one working step from a stack of metal plates by wire-EDM, with all tapered circumferential surface sections of the cutting elements which are simultaneously cut out in one working step defining the teeth in radial direction and extending on the generated surface of a cone.

9. A method according to claim 8, characterized in that the cutting elements are cut out in sets from the stack of metal plates by means of wire-EDM, with the tapered circumferential surface sections of the cutting elements which are arranged in sets at the same position defining the teeth and having different small and large diameters but the same angle of inclination and with the cutting elements of different sets being successively placed on the cylindrical body.

10. A method of making a broach for external broaching, with the broach being of the type including a plurality of suitably graded cutting elements, each of which having a central opening defined by an inner peripheral surface, and a cutting edge defined on the peripheral surface, said method comprising the steps of:
making the cutting elements from metal plates by providing each metal plate with a hole which is smaller than the central opening, and cutting out the central opening from the metal plate along a line surrounding the hole by means of electric discharge between an electrically conductive wire and the metal plate; and successively arranging the cutting elements on a support unit.

11. A method according to claim 10 characterized in that at least some of the cutting elements are cut out simultaneously in one working step from a stack of metal plates by means of wire electric-discharge machining.

* * * * *